United States Patent [19]
Putt

[11] Patent Number: 5,458,988
[45] Date of Patent: * Oct. 17, 1995

[54] METAL-AIR-CELLS HAVING IMPROVED ANODE ASSEMBLIES

[75] Inventor: Ronald A. Putt, Marrieta, Ga.

[73] Assignee: Matsi, Inc., Atlanta, Ga.

[ * ] Notice: The portion of the term of this patent subsequent to Jul. 12, 2011 has been disclaimed.

[21] Appl. No.: 104,734

[22] Filed: Aug. 10, 1993

[51] Int. Cl.$^6$ .......................... H01M 2/12; H01M 12/06
[52] U.S. Cl. .................... 429/27; 429/53; 429/66
[58] Field of Search ................... 429/27, 53, 54, 429/55, 66, 72, 82, 86, 190, 29, 241, 242

[56] References Cited

U.S. PATENT DOCUMENTS

| | | | |
|---|---|---|---|
| 2,620,368 | 12/1952 | Ruben . | |
| 2,629,758 | 2/1953 | Ruben . | |
| 2,650,945 | 9/1953 | Herbert . | |
| 2,723,301 | 11/1955 | West, Jr. et al. . | |
| 2,729,694 | 1/1956 | Ellis . | |
| 2,816,154 | 12/1957 | Mendelsohn . | |
| 2,938,064 | 5/1960 | Kordesch . | |
| 2,960,558 | 11/1960 | Marsal et al. . | |
| 3,042,733 | 7/1962 | Toda et al. . | |
| 3,124,487 | 3/1964 | Duddy et al. . | |
| 3,177,096 | 4/1965 | Jache . | |
| 3,479,387 | 2/1970 | Amiet . | |
| 3,519,485 | 7/1970 | Chassoux et al. . | |
| 3,533,845 | 10/1970 | Katsoulis | 429/27 |
| 3,598,655 | 8/1971 | Hamlen et al. . | |
| 3,630,785 | 12/1971 | Whitestone et al. . | |
| 3,682,706 | 8/1972 | Yardney et al. . | |
| 3,716,413 | 2/1973 | Eisner . | |
| 3,765,942 | 10/1973 | Jache . | |
| 3,847,669 | 11/1974 | Paterniti . | |
| 3,855,000 | 12/1974 | Jammet . | |
| 3,871,920 | 3/1975 | Gerbier et al. . | |
| 3,881,959 | 5/1975 | Tsuchida et al. . | |
| 3,884,721 | 5/1975 | Tucholski . | |
| 3,897,267 | 7/1975 | Tseung et al. . | |
| 3,905,834 | 9/1975 | Harada et al. . | |
| 3,918,990 | 11/1975 | Enters . | |
| 3,922,178 | 11/1975 | Winger . | |
| 3,961,985 | 6/1976 | Takamura et al. . | |
| 4,009,320 | 2/1977 | Gerbier . | |
| 4,041,211 | 8/1977 | Wiacek . | |
| 4,054,726 | 10/1977 | Sauer et al. . | |
| 4,115,626 | 9/1978 | Saner et al. | 429/27 |
| 4,135,039 | 1/1979 | Jenkins . | |
| 4,145,482 | 3/1979 | von Benda . | |
| 4,172,924 | 10/1979 | Warszawski . | |
| 4,211,830 | 7/1980 | Chevet . | |
| 4,214,044 | 7/1980 | Chevet et al. . | |
| 4,220,690 | 9/1980 | Blurton et al. . | |
| 4,224,736 | 9/1980 | Feldhake . | |
| 4,246,324 | 1/1981 | de Nora et al. . | |
| 4,248,944 | 2/1981 | Smilanich . | |
| 4,282,293 | 8/1981 | van Lier . | |
| 4,303,743 | 12/1981 | Réau . | |
| 4,303,748 | 12/1981 | Réau . | |
| 4,333,993 | 6/1982 | Gibbard . | |
| 4,341,847 | 7/1982 | Sammells . | |
| 4,343,869 | 8/1982 | Oltman et al. . | |
| 4,389,466 | 6/1983 | Joy . | |
| 4,404,266 | 9/1983 | Smilanich . | |
| 4,464,446 | 8/1984 | Berger et al. . | |
| 4,491,625 | 1/1985 | Sarbacher et al. . | |
| 4,551,399 | 11/1985 | Despic . | |
| 4,557,983 | 12/1985 | Sauer . | |
| 4,565,749 | 1/1986 | van Ommering et al. . | |
| 4,585,710 | 4/1986 | McEvoy . | |
| 4,591,539 | 5/1986 | Oltman et al. . | |
| 4,595,643 | 6/1986 | Koshiba et al. . | |
| 4,608,325 | 8/1986 | Ismail . | |
| 4,614,696 | 9/1986 | Ito et al. . | |
| 4,640,874 | 2/1987 | Kelm . | |
| 4,687,714 | 8/1987 | Ottman et al. | 429/27 |
| 4,725,515 | 2/1988 | Jurca . | |
| 4,740,435 | 4/1988 | Markin et al. . | |
| 4,797,190 | 1/1989 | Peck . | |
| 4,838,422 | 6/1989 | Gregerson . | |
| 4,842,963 | 6/1989 | Ross, Jr. | 429/21 |
| 4,894,295 | 1/1990 | Cheiky . | |
| 4,894,300 | 1/1990 | Kugler . | |
| 4,925,744 | 5/1990 | Niksa et al. | 429/34 X |
| 4,927,717 | 5/1990 | Turley et al. | 429/27 |
| 4,939,048 | 7/1990 | Vignaud . | |
| 4,957,826 | 9/1990 | Cheiky | 429/27 |
| 4,965,147 | 10/1990 | Mas et al. . | |
| 4,988,581 | 1/1991 | Wycliffe . | |

| | | |
|---|---|---|
| 5,114,806 | 5/1992 | Chiacchio et al. . |
| 5,176,966 | 1/1993 | Epp et al. . |
| 5,328,778 | 7/1994 | Woodruff et al. ............. 429/27 |

FOREIGN PATENT DOCUMENTS

| | | |
|---|---|---|
| 2222761 | 10/1974 | France . |
| 46-8332 | 3/1971 | Japan . |
| 49-121936 | 3/1974 | Japan . |
| 50-26044 | 3/1975 | Japan . |
| 50-26040 | 3/1975 | Japan . |
| 50-26041 | 3/1975 | Japan . |
| 57-21069 | 2/1982 | Japan . |
| 57-34667 | 2/1982 | Japan . |
| 57-60660 | 4/1982 | Japan . |
| 57-69679 | 4/1982 | Japan . |
| 58-32360 | 2/1983 | Japan . |
| 58-54559 | 3/1983 | Japan . |
| 58-145065 | 8/1983 | Japan . |
| 58-140968 | 8/1983 | Japan . |
| 59-33753 | 2/1984 | Japan . |
| 59-66060 | 4/1984 | Japan . |
| 60-91562 | 5/1985 | Japan . |
| 7214308 | 5/1973 | Netherlands . |
| 143849 | 3/1961 | U.S.S.R. . |
| 1246922 | 9/1971 | United Kingdom . |
| 1360779 | 7/1974 | United Kingdom . |
| 2118762 | 11/1983 | United Kingdom . |

OTHER PUBLICATIONS

McLarnon et al., "The Secondary Alkaline Zinc Electrode, " *J. Eletrochem Soc.,* 138:2, pp. 645–664 (Feb. 1991).

Merck Index, p. 302 (11th Ed.), 1958, (Month not available).

Kirk—Othmer, "Encyclopedia of Chemical Technology, " Vol. 3, 402, 503–639, 663–670 (3rd Ed).

*Primary Examiner*—Anthony Skapars
*Attorney, Agent, or Firm*—Leydig, Voit & Mayer, Ltd.

[57] ABSTRACT

The subject invention provides for a prismatic zinc-air cell comprising a prismatic container, an air cathode, and an anode assembly. The prismatic container has one or more oxygen access openings, and the air cathode is disposed in the container in gaseous communication with the oxygen access openings. The anode assembly comprises a rectangular anode frame having peripheral members, a separator mounted proximate to one end of the anode frame and extending substantially continuously between the anode frame peripheral members. The anode frame and separator thereby define a trough. The anode assembly also comprises a zinc anode which comprises zinc, an aqueous electrolyte, and a gelling agent. The zinc anode is disposed in the trough in electrolytic contact with a first side of the separator, and the anode assembly is disposed in the containers such that a second side of the separator is in electrolytic contact with the air cathode.

14 Claims, 4 Drawing Sheets

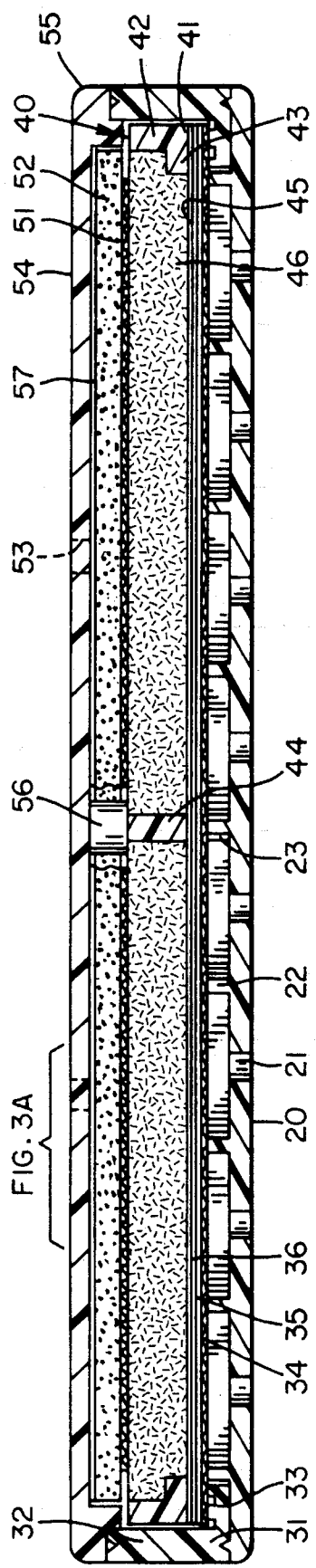
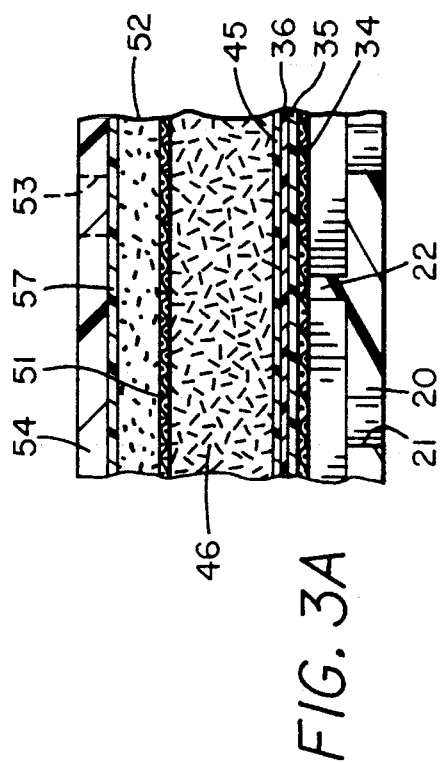
FIG. 3
FIG. 3A

METAL-AIR-CELLS HAVING IMPROVED ANODE ASSEMBLIES

FIELD OF THE INVENTION

The present invention relates to metal-air cells and, more particularly, to metal-air cells having an improved anode assembly which comprises an anode trough and to methods for fabricating such cells.

BACKGROUND OF THE INVENTION

Metal-air cells typically include a metal anode, an air cathode, and a separator all disposed and supported in some sort of container. The metal anode usually comprises a fine-grained metal powder, such as zinc, aluminum, or magnesium, which is blended together with an aqueous electrolyte, such as potassium hydroxide, and a gelling agent into a paste. The separator is a porous material that allows the passage of electrolyte between the cathode and anode, but prevents direct electrical contact therebetween and short circuiting of the cell.

The air cathode is a catalytic structure designed to facilitate the reduction of oxygen. Typically, it is composed of active carbon, a binder, and a catalyst which, together with a metal current collector, are formed into a thin sheet. The air cathode also commonly incorporates a hydrophobic polymer, such as polytetrafluoroethylene or polystyrene, directly into the cathode sheet and sometimes also as a coextensive film. The hydrophobic polymer prevents electrolyte from flooding the cathode or passing through it and leaking from the cell. The container includes oxygen access openings, diffusion chambers and the like which are designed to allow sufficient oxygen to reach all parts of the air cathode.

Metal-air cells have high specific energies. In fact, zinc-air cells have the highest specific energy, up to 450 Wh/kg, of all aqueous primary systems, and high energy per unit volume as well. The components of zinc-air cells also are relatively benign.

Because of their high energy density, button cells incorporating zinc-air chemistry are the most popular batteries for hearing aids. The much larger majority of electronic devices, however, has higher energy requirements requiring the use of larger (i.e., greater than one ampere-hour capacity) cells or batteries. Despite the electrochemical advantages of metal-air and especially zinc-air systems, carbon-zinc and alkaline manganese dioxide systems continue to dominate the much larger world market for larger primary batteries.

Many portable electronic devices, such as portable computers, also place severe constraints on battery weight and volume. In such applications, prismatic cells would be preferable over button or cylindrical cells, which latter type of cells, in general, require more space to be allocated in the device than the cells themselves actually occupy. Prismatic cells also can be much thinner than alkaline cells of equivalent capacity.

Attempts to scale up and reconfigure zinc-air button cells to a larger, prismatic configuration, however, have generally failed. Zinc-air batteries currently are not a competitive option for use in the full spectrum of consumer and electrical products, and they represent a small portion of all primary batteries sold today.

A major problem has been in achieving an inexpensive, light-weight and easily constructed prismatic configuration which is leak-proof, but which provides for efficient electrochemical discharge of the cell. The design of conventional zinc-air button cells and existing manufacturing procedures have not solved the problems for prismatic cells.

A further and significant problem concerns designing a prismatic zinc-air cell that would be amenable to assembly for mass production.

It is important, but sometimes difficult, to prevent electrolyte and anode paste from contacting sealing surfaces. Virtually all commercial zinc-air button cells utilize a multicomponent container, at least one part or subassembly of which is shaped substantially like a cup. A preconstituted anode paste may be filled into the cup. Alternately, a dry mix of zinc and gelling agent may be poured into the cup, after which aqueous electrolyte is added. In either event, the process of loading the cup can be relatively messy. Paste or electrolyte may be spilled onto the sealing surface of the cup in the loading process.

Also, at times too much anode material may be loaded into the cup, and the excess material squeezed into sealing areas when the container is assembled. If anode paste or electrolyte contaminates container sealing surfaces through such processing accidents or any other mechanism, it can cause imperfections in the seal through which leaks may occur. In larger cells, the area which must be sealed is correspondingly larger, and thus, the likelihood of defects occurring in the seal is correspondingly greater.

It also is important to control relatively precisely the amount of gelled zinc anode paste which is incorporated into a cell. By doing so, costs may be controlled more closely; and cells having more uniform discharge capacities will be produced. As noted, if too much anode material is loaded into a cell container, the excess anode material also may be squeezed into sealing areas when the container is assembled.

If the container is constructed from plastic materials, however, problems may be created if too little anode material is dispensed into the container. Most commercial zinc-air cells have conductive, metal containers, and the gelled zinc anode paste is in intimate contact with the container. Plastic is nonconductive, and so zinc-air cells with plastic containers must incorporate an anode current collector. Such collectors often are in the form of a thin metal sheet or wire grid, and such current collectors should be in intimate electrical contact with the anode to the greatest extent possible. If too little gelled zinc anode paste is dispensed into the cell, electrical contact between the current collector and the anode may be impaired.

It seems apparent that, for considerable time, there has existed a substantial need for larger prismatic metal-air cells, especially for thin prismatic zinc-air cells, which can satisfy the energy requirements for a wide variety of applications. It seems further apparent that a considerable amount of effort has been directed to providing suitable cells capable of providing satisfactory performance. Yet, despite recognition of the need and the considerable efforts made to date, there still exists the need for prismatic, and especially for thin prismatic metal-air cells such as zinc-air, which can provide satisfactory and reliable performance for a wide variety of commercial applications.

An object of this invention, therefore, is to provide a prismatic metal-air cell which provides more reliable electrochemical performance in service. A related and more specific object is to provide a thin prismatic zinc-air cell having satisfactorily reliable electrochemical performance in service.

It also is an object to provide a prismatic zinc-air cell having a gelled zinc anode which is more leak resistant. A related object is to provide such a cell wherein the container parts may be sealed together more reliably.

Another object of this invention is to provide a prismatic zinc-air cell having a gelled zinc anode in which the amount of gelled zinc anode paste dispensed into the cell is more precisely controlled.

It is a further object of this invention to provide prismatic zinc-air cells having a gelled zinc anode and a plastic container, wherein more reliable contact between the gelled zinc anode and the anode collector is provided.

Yet another object of this invention is to provide a prismatic zinc-air cell which is simple in design and easily and economically manufactured in mass production.

It also is an object of this invention to provide a method of fabricating prismatic zinc-air cells with a gelled zinc anode which produces more reliable sealing of container parts.

Another object is to provide such methods which control more precisely the amount of gelled zinc anode paste dispensed into a cell.

It is a further object of this invention to provide a method for fabricating a prismatic zinc-air cell with a gelled zinc anode and a plastic container which produces more reliable contact between the gelled zinc anode and the anode collector.

Yet another object of this invention is to provide a prismatic zinc-air cell with a gelled zinc anode and methods for fabricating such cells wherein all of the above-mentioned advantages are realized.

Those and other objects and advantages of the invention will be apparent to those skilled in the art upon reading the following detailed description and upon reference to the drawings.

SUMMARY OF THE INVENTION

The subject invention provides for a prismatic zinc-air cell comprising a prismatic container, an air cathode, and an anode assembly. The prismatic container has one or more oxygen access openings, and the air cathode is disposed in the container in gaseous communication with the oxygen access openings.

The anode assembly comprises a rectangular anode frame having peripheral members, a separator mounted proximate to one end of the anode frame and extending substantially continuously between the anode frame peripheral members. The anode frame and separator thereby define a trough.

The anode assembly also comprises a zinc anode which comprises zinc, an aqueous electrolyte, and a gelling agent. The zinc anode is disposed in the trough in electrolytic contact with a first side of the separator, and the anode assembly is disposed in the containers such that a second side of the separator is in electrolytic contact with the air cathode.

Preferably, the dimensions of the anode frame are selected such that the volume within the trough is substantially equal to the volume of a predetermined amount of zinc anode. The initial volume of zinc anode in the anode assembly preferably is substantially equal to the volume within the trough.

The anode frame also preferably includes one or more cross members extending between the anode frame peripheral members. A current collector comprising a grid fabricated from double-pulled copper foil is another preferred feature of the subject invention, as is a container fabricated from a top part, bottom part and cathode frame.

Further, and more broadly, the present invention provides a thin-walled plastic prismatic zinc-air cell design that is readily amenable to mass production. In the preferred embodiment, the cell is assembled from a bottom, a cathode assembly, an anode assembly, and a top assembly. The manufacturing advantages resulting from this preferred embodiment are considerable, as will be more fully discussed hereinafter.

The subject invention also provides a method of fabricating a prismatic zinc-air cell having an anode, cathode, separator, and electrolyte in a container. A rectangular anode frame having peripheral members and open ends is provided. A separator is mounted on the anode frame between the peripheral members thereof and proximate to one open end of the anode frame.

The anode frame and separator define a trough. Gelled zinc anode paste comprising zinc, an aqueous electrolyte, and a gelling agent, is dispensed into the trough in electrolytic contact with a first side of the separator to form an anode assembly.

An air cathode is disposed in a prismatic container having one or more oxygen access openings such that the oxygen access openings are in gaseous communication with the air cathode. The anode assembly is disposed in the container such that a second side of the separator is in electrolytic contact with the air cathode.

It will be appreciated, therefore, that the design of the novel cells makes it possible to fabricate larger prismatic zinc-air cells which have more reliable electrochemical performance and avoid many of the problems associated with existing metal-air cells. For example, zinc-air cells having the anode assembly of the subject invention can be loaded with gelled zinc anode paste more accurately and reliably. The anode frame and separator define a trough, the volume of which can be selected to accommodate the desired amount of gelled zinc anode paste. Dispensing equipment can be set to dispense a slight excess of paste, since excess amounts can be easily scraped out of the tray. Thus, there is less likelihood that too little gelled zinc anode pastes will be dispensed. Poor contact between the paste and anode current collector, which otherwise can occur if too little paste is dispensed, is less likely to occur.

Further, because cells of the subject invention incorporate a trough, they will tend to have fewer defects in their seals. Overloading of the cell with anode paste can be avoided easily by using the trough. Thus, it is less likely that there will be excess paste in the cell which can be squeezed into sealing areas when the cell is prepared for final assembly. Moreover, all preliminary sealing of the cell components may be done remote from the site where paste is loaded into the trough. Since the container itself is not loaded with paste, the container pieces and their sealing surfaces are not exposed to spills and other accidents during the loading process. Thus, the likelihood of spilled electrolyte or paste causing a defect in the seal of the cell is greatly diminished.

BRIEF DESCRIPTION OF THE DRAWINGS

FIG. 3 is a cross-sectional view taken generally along the plane defined by lines 3—3 of the cell 10 shown in FIG. 1, showing in particular the internal components of the cell in assembled position;

FIG. 3A is an enlargement of the area denoted by bracket 3A in FIG. 3;

DETAILED DESCRIPTION OF THE INVENTION

Figure 1:
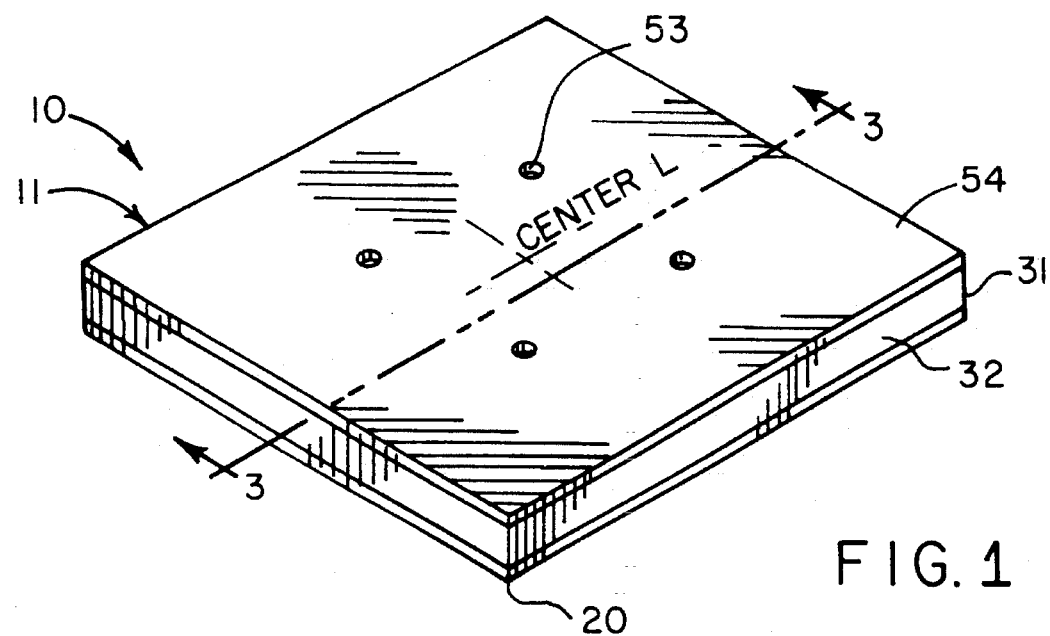
FIG. 1 is a perspective view of a preferred embodiment of the metal-air cells of the subject invention, showing in particular a zinc-air cell 10 and an array of vent openings in the top of the cell container.

FIGS. 1–4 illustrate a preferred embodiment of the subject invention. As seen in FIG. 1, the cell 10 comprises a prismatic container 11. The container 11 has a generally solid-rectangular shape having bottom, side, and top walls. The approximate dimensions of the cell 10 are 3.6"×3.6"× 0.423". As compared to button cells, which are the most common configuration for zinc-air cells, the cell 10 is very large. Button cells typically measure only about ¼" to ⅜" in diameter and about ¼" or less in height. Accordingly, cells of the subject invention incorporate greater amounts of active zinc, thus they have greater capacity and are more suitable for electrical devices having higher energy requirements.

Moreover, the cell 10 has a very simple surface geometry. That makes it easier to design and build battery containers in electronic devices. A prismatic shape and simple surface geometry also enable more effective space utilization both within the cell and within an electronic device and makes it easier to assemble batteries using two or more individual cells.

It should be understood that the terms "top", "bottom", "side", and the like as used herein are relative terms and are employed for convenience in describing the various embodiments of this invention. In service, the novel cells can be used in any orientation.

Figure 2:
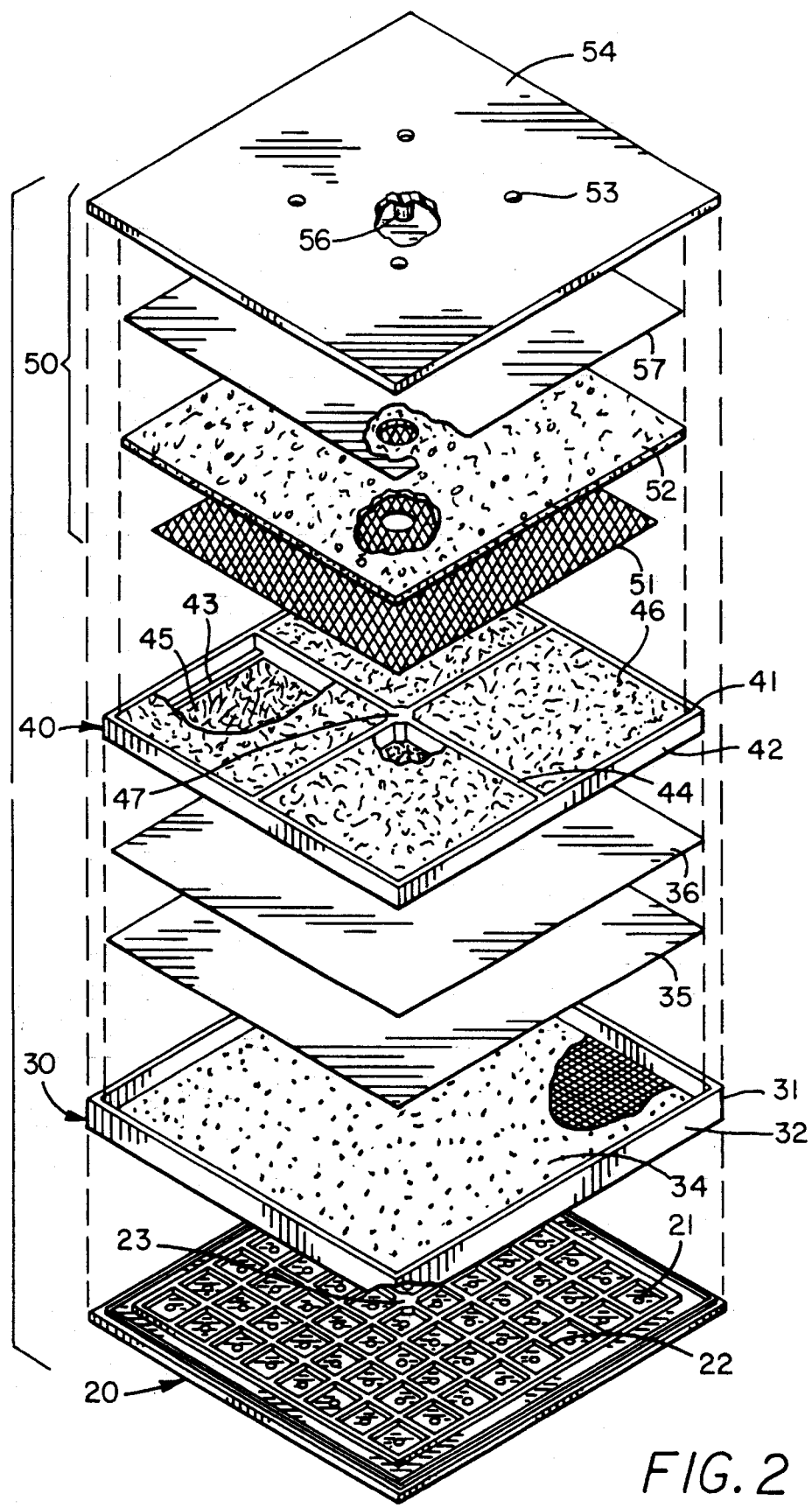
FIG. 2 is an exploded perspective view of the cell 10 shown in FIG. 1 showing further details of the internal components of the cell and the components of the cell container.

The internal components of this preferred embodiment of the cells of this invention, as shown in FIGS. 2, 3, and 3A, are disposed generally in flat layers extending generally parallel to the top and bottom walls of the container 11 and substantially continuously between the side walls of the container 11. Those internal components include, going from the bottom of the cell 10 up, an air cathode 34, a supplemental separator 35, an oxygen impermeable membrane 36, an anode assembly 40 comprising an anode frame 41, primary separator 45, and anode 46, an anode current collector 51, a foam member 52, and a hydrophobic membrane 57. The container 11 in this preferred embodiment is composed of three parts, a bottom 20, a cathode frame 31, and a top 54, and substantially encloses and supports the internal components of the cell 10.

As will be appreciated readily by those skilled in the art, the cathodic and anodic material, in this cell oxygen and zinc, must not come into direct contact. Otherwise, zinc will be directly oxidized and the electrochemical potential of the cell will be wasted. The cell reaction instead must proceed by various intermediate reactions involving catalytic reduction of oxygen at the cathode, migration of intermediate species through the electrolyte solution, and ultimately oxidation of zinc at the anode.

Thus, there must be electrolytic communication between the air cathode 34 and the anode 46 and through the supplemental separator 35, oxygen impermeable membrane 36, and the primary separator 45 which are interposed therebetween. That is, electrolyte must be able to migrate between the air cathode 34 and zinc anode 46. To the extent that electrolytic communication is diminished, performance of a cell suffers. As will become apparent from the discussion herein, however, cells of the subject invention establish and maintain effective electrolytic communication in the cell.

Figure 4:
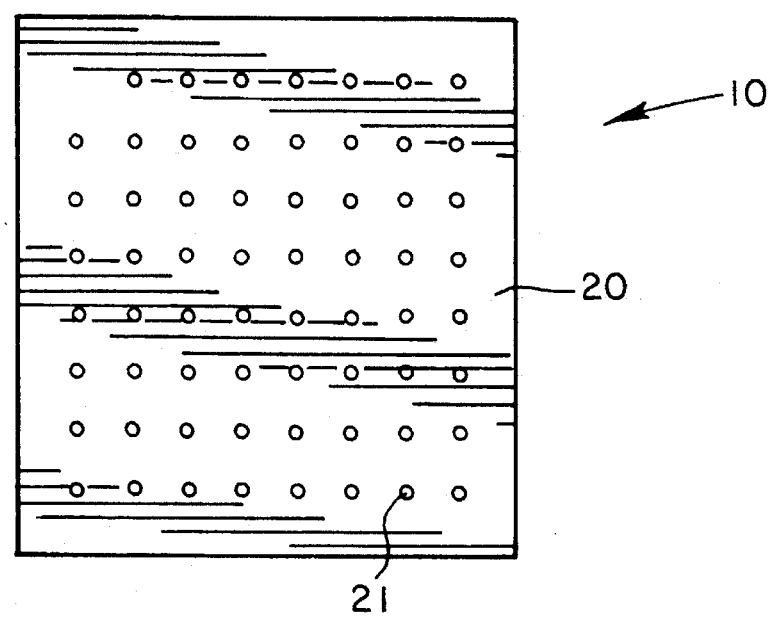
FIG. 4 is a bottom plan view of the cell 10 shown in FIG. 1, showing in particular an array of oxygen access openings in the cell container.

As best seen in FIGS. 3 and 4, a plurality of relatively small oxygen access openings 2 are uniformly distributed in the bottom 20 of the container 11. The oxygen access openings 2 allow air to pass through the bottom wall of the container ultimately into contact with the air cathode 34, thereby providing a source of oxygen to the cell.

The bottom 20 of the container also is provided with a grid-like pattern of intersecting ribs 22 which extend across the interior surface of the bottom 20 and upwards therefrom into contact with the lower surface of the air cathode 34. Those ribs 22, together with the interior surface of the bottom 20 of the container 1, define a plurality of oxygen diffusion chambers, each of which is in gaseous communication with an oxygen access opening 21 and is immediately adjacent to a portion of the lower surface of the air cathode 34.

The oxygen diffusion chambers ensure more efficient, uniform diffusion of oxygen into the air cathode 34 than would occur if the air cathode 34 were mounted immediately adjacent the bottom 20 container 11. Under such circumstances, relatively large portions of the surface area of the air cathode would not be directly exposed to atmospheric oxygen and the performance of the cell could be diminished. If a cell has a diffusion chamber, however, the number and size of oxygen access openings may be reduced. The container wall, therefore, will be stronger and provide greater protection for the air cathode from mechanical damage. Accordingly, cells of the subject invention preferably incorporate an oxygen diffusion chamber.

The cell 10 has 64 circular oxygen access openings 21, each of which are approximately 1/16" in diameter. Likewise, there are 64 diffusion chambers, one chamber associated with each oxygen access opening 21. This configuration has been found to provide good performance in cells constructed as shown in FIGS. 1–4, but other cells may require greater or less circulation.

In general, oxygen access openings and diffusion chambers should allow enough oxygen to reach the air cathode to satisfy the electrochemical requirements of a cell, bearing in mind that excess air access will increase evaporation of water from the cell. The precise number, size, shape, and arrangement of oxygen access openings and the size and configuration of diffusion chambers in cells of the subject invention can be varied to achieve whatever level of circulation is desired, as is known in this field.

As noted, the upper surfaces of the ribs 22 abut the air cathode 34, thereby providing support for the air cathode 34. The cells of the subject invention preferably incorporate some means of providing such support. Otherwise, the air cathode may tend to bow or shift away from the anode 46, disrupting electrolytic communication therebetween. The ribs 22 are an efficient means of providing such support, while also defining oxygen diffusion chambers, and, at the same time, greatly reinforce the bottom 20 of the container 11. Other means of supporting the air cathode 34, however, may be utilized. For example, a loose woven polyethylene screen or layer or an open-cell foam member may be disposed in an oxygen diffusion chamber which extends substantially between the side walls of the container.

As best shown in FIGS. 2 and 3, the air cathode 34 is mounted on an open, generally rectangular cathode frame 31 having peripheral members 32. More specifically, the air cathode 34 is mounted across the cathode frame 31 proximate to its lower end on ledges 33 provided for that purpose. The air cathode 34 serves to catalyze the reduction of oxygen. Preferably, as does the air cathode 34 in the cell 10, the air cathode in cells of the subject invention also provides a barrier to the passage of electrolyte.

Suitable air cathodes may be fabricated from conventional materials by conventional methods, for example, by pressing a powder mix of active carbon, catalyst, and binder onto a metallic current collector. Electrolyte barriers can be formed by incorporating hydrophobic polymer particles into the cathode material or by mounting a film of hydrophobic polymer coextensively with the air cathode. Suitable air cathode materials also are commercially available, for example, gas diffusion electrodes from Eltech Research Corp., Fairport Harbor, Ohio.

In accordance with the subject invention, the cells 10 incorporate a primary separator 45 which, as noted above, is a component of the anode assembly 40. In addition to the primary separator 45, however, cells of the subject invention also may, and preferably do incorporate other separator elements, and many such separators are known to those who work in this field. According to the illustrative preferred embodiment, a three-part separator system is utilized which comprises the supplemental separator 35 and the oxygen impermeable membrane 36 in addition to the primary separator 45. As shown in FIGS. 2, 3, and 3A, the supplemental separator 35 is immediately adjacent and in intimate electrolytic communication with the air cathode 34. The supplemental separator 35 serves to isolate the air cathode 34 and the anode 46 from direct electrical contact, while allowing electrolyte to pass therebetween. The supplemental separator 35 also provides an additional barrier to migration of peroxide ions. Peroxide ions are formed at the air cathode 34 and, if those ions migrate to and react with zinc in the anode 46, the electrochemical efficiency of the cell 10 will be diminished. The supplemental separator 35 may be fabricated from a variety of materials which are well known to workers in the art as being suitable for such purposes. Such materials include, for example, polyvinyl alcohol or polyamide papers.

The oxygen impermeable membrane 36 is positioned immediately adjacent to the supplemental separator 35. Cells of the subject invention optionally, but preferably, incorporate oxygen impermeable membrane 36 or its equivalent because inclusion of this component contributes to greater utilization of zinc, especially in large cells. The advantages and manner of using oxygen impermeable membranes is described in greater detail in application Ser. No. 08/105,073 entitled Metal-Air Cells Having Improved Anode Utilization, filed on Aug. 10, 1993, now abandoned and the disclosure of such membranes and their use in metal-air cells is incorporated herein by reference.

As shown in FIGS. 2 and 3, the anode assembly 40 is positioned immediately adjacent to the oxygen impermeable membrane 36. This assembly 40, as previously noted, comprises anode frame 4, primary separator 45, and anode 46. The anode frame 4 is a generally rectangular, open frame-like structure having four peripheral members 42 and a pair of intersecting cross members 44. The primary separator 45 is mounted across the anode frame 41 proximate to its lower end on ledges 43 provided for that purpose. Primary separator 45 extends substantially continuously between the peripheral members 42. The anode frame 4 and primary separator 45 thereby define a trough.

The anode 46 is a gelled paste which is carried in the trough in intimate electrolytic communication with the top side of the primary separator 45. The anode assembly 40 is disposed in the container such that the bottom side of the primary separator 45 is in electrolytic communication with the oxygen impermeable membrane 36 and, ultimately, the top side of the air cathode 34.

Primary separator 45 may be of like construction and composition as the supplemental separator 35 or may be made from any other material satisfactory for metal-air cell separators. As does supplemental separator 35, the primary separator 45 serves to isolate the air cathode 34 and anode 46 from direct electrical contact, yet allows passage of electrolyte therebetween. It will be appreciated, however, as previously discussed herein, the primary separator 45 further, and importantly, serves as, in effect, a support for the anode material.

Suitable gelled zinc anode pastes 46 comprise zinc, an aqueous electrolyte, and a gelling agent. Small amounts of other additives may be incorporated in the paste to impart various physical and electrochemical properties. Suitable electrolytes and additives are well known to those working in this field.

The gelled zinc anode paste 46 also, optionally, but preferably, incorporates an inert, insoluble, anode volume stabilizer, especially if the size of the cell is relatively large. It has been found that larger cells incorporating such anode volume stabilizers provide more reliable electrolytic communication between the anode 46 and primary separator 45 as the cell is discharged in use. The advantages and manner of using such anode volume stabilizers is described in detail in the above referenced '073 application entitled Metal-Air Cells Having Improved Anode Utilization and the description and use of such anode volume stabilizers is incorporated herein by reference.

The precise components of the gelled zinc anode paste 46 and their proportions, however, may be varied as desired. It will be appreciated that a wide variety of gelled zinc anode pastes may be used to advantage in cells of the subject invention.

The cell 10 also preferably comprises one or more anode support members, exemplified by a pair of intersecting members 44 in the anode frame 41, which are embedded in the gelled zinc anode paste 46 and extend generally perpendicular thereto. It will be appreciated that anode support members further assist in maintaining more reliable electrolytic communication between the anode 46 and the primary separator 45. That is, even though gelled zinc anode paste is quite viscous, it is believed that the paste may be susceptible to being dislodged from contact with a separator by mechanical shocks and impacts to a cell, particularly when the cell is a large prismatic cell. The anode support members tend to prevent such shifting and the creation of air pockets between the anode and separator which, as noted above, have deleterious effects on the discharge rates and capacity of the cell.

The intersecting members 44 have been found to provide effective support for the anode 46, are easily fabricated, and utilize minimal material. In general, anode support members should be designed to provide sufficient support, while bearing in mind that such supports do occupy space which otherwise could be utilized for anode material. Accordingly, it will be appreciated that suitable anode support members may have various configurations in addition to that exemplified by intersecting members 44, for example, serpentine or zig-zag shaped members. Likewise, anode support members may be anchored to the container, for example, to its side and top walls.

As noted, the anode frame 4 and separator 45 define a trough, and it will be appreciated that by incorporating this trough, cells of the subject invention have significantly improved performance and reliability. That is, the dimensions of the anode frame 41 can be selected such that the volume of the trough accommodates precisely a predetermined amount of gelled zinc anode paste. Gelled zinc anode paste then can be loaded into the trough instead of a container part. Since excess amounts of paste can be scraped easily out of the tray, dispensing equipment can be set to dispense a slight excess of paste and there is less likelihood of under or overloading paste into the trough.

Since the amount of paste is dispensed more reliably to a predetermined level, it is easier to establish good electrical contact between an anode current collector and the anode. Gaps between the current collector and anode, which otherwise might occur if too little paste is dispensed, are less likely. Moreover, seals with the cell can be formed more reliably if the paste is dispensed in reliably controlled amounts. Since there is less likelihood of overloading, there is less likelihood that excess paste will be squeezed into sealing areas upon final assembly of the cell.

Moreover, by dispensing the gelled zinc anode paste into the trough instead of a container part, defects in the container seals are less likely to occur. The dispensing process can be performed in an isolated area. Any spillage of the electrolyte which might occur during dispensing the anode paste, therefore, has a low probability of contaminating the sealing areas of the container parts. The paste, once dispensed into the trough, is sufficiently immobile that there is little likelihood that it will be spilled during final assembly of the cell. Thus, the sealing area of the container stays cleaner, and more reliable seals between container parts may be formed.

It also will be appreciated that the anode assembly, when used together with the three-part container shown in the illustrative, preferred embodiment, contributes to a generally efficient manufacturing process. The anode frame 4 provides a convenient anchor for the anode support members 44. In the absence of the anode frame 41, it might be necessary to fabricate additional pieces or perform additional assembly steps to incorporate support members for the anode. Moreover, the anode assembly and three-part container allow the cell to be assembled from subassemblies which can be quality checked prior to final assembly. Final assembly also is simplified because it mainly involves the manipulation and sealing of discrete structures and does not require dispensing of paste. The overall result of these advantages is that the present invention should allow production of large quantities of cells in a commercially viable manner.

The anode current collector 5 is embedded in the anode paste 46 as can be seen in FIGS. 2, 3 and 3A. Suitable collectors may be provided by metal sheets and mesh, and a variety of such collector materials are known to workers in the art and may be used in cells of the subject invention.

An expanded mesh of double-pulled copper foil, however, is especially preferred. The cost of such material is reasonable, and copper is an excellent conductor. Moreover, the double-pulled copper foil mesh has a high surface area to volume ratio, and the mesh has a large void volume. Thus, the mesh may be deeply embedded in a gelled zinc anode paste without displacing a significant amount of paste. The depth of the grid, usually about 0.020–0.025 inch, also makes it easier, as compared to more shallow current collectors, to establish contact with the anode paste if slight areas of clearance exist between the gelled zinc anode paste and foam member 52.

As shown in FIG. 3, the expansion space is defined at its bottom by the upper surface of the anode assembly 40, on its side by those portions of the inner surfaces of the cathode frame 31 extending upwards beyond the upper surface of the anode assembly 40 and the inner surfaces of a skirt 55 of the top 54, and on its top by the inner surface of the container top 54. The vent openings 53 are disposed in the container top 54 in gaseous communication with the expansion chamber.

As shown in FIGS. 2 and 3, the foam member 52 is configured and disposed in the container 11 such that it generally occupies the expansion space. Its lower side is adjacent to the upper side of the anode 46, with the hydrophobic membrane 57 interposed between the top side of the foam and the inner surface of the container top 54.

The expansion space provides an area into which anodic growth can occur. As the anode 46 expands during discharge, the foam member 52, which otherwise occupies the expansion space, is compressed. Gases within the foam member 52 are likewise forced to evacuate from the foam member 52 and exit the cell 10 via the vent openings 53, thereby minimizing pressure increases within the container 11.

The cells of the subject invention preferably utilize an expansion chamber, foam member 52, and vent openings 53 as shown in FIGS. 1–4, or their equivalent, especially if the cells are large. This configuration significantly enhances the performance of the cell, and in particular, avoids the many problems associated with high internal cell pressures which especially can plague flat prismatic cells having lightweight plastic containers. The advantages and manner of using such design features are described in greater detail in the application entitled Metal-Air Cells Comprising Collapsible Foam Members and Means for Minimizing Internal Pressure Buildup, Ser. No. 105,354 filed by Glenn Woodruff and Ronald A. Putt on Aug. 10, 1993, now U.S. Pat. No. 5,328,778, and the disclosure of that application relating to such design features is incorporated herein by reference.

The various structural components of the cell, as exemplified by bottom 20, cathode frame 3, anode frame 41, and top 54, may be fabricated from any material which is compatible with the electrochemistry of the cell. Various materials are known for metal-air cells and may be used in cells of the subject invention.

If the cell is large, however, weight considerations make the use of structural plastics highly preferable and, if the cell accommodates an expansion chamber and vent openings, structural plastics are a practical alternative. Such plastics include polyethylene, polypropylene, and nylon. Acrylonitrile-butadiene-styrene plastics are especially preferred for their attractive mechanical and thermal processing characteristics, as well as being cost effective.

Suitable plastic components may be fabricated by injection molding or other conventional methods. The air cathode, separator, and any additional separators or membranes, may be mounted to the container parts by conventional adhesives, such as hot-melt or epoxy adhesives. The container parts preferably include ledges and beads to facilitate the mounting process. Likewise, the container parts may be sealed by ultrasonic welding or by any other conventional method, and these container parts may be provided with various stops, beads, and the like to facilitate final assembly and sealing of the container.

In particular, as will be understood more readily by reference to FIG. 4, the cell 10 preferably is fabricated by mounting the air cathode 34 on the cathode frame 31 by hot-melt or epoxy adhesives. Suitable leads and terminals (not shown) are connected to the current collector of the air cathode 34 to form a cathode assembly 30. Appropriate leads and terminals are known and may be used.

The hydrophobic membrane 57 is mounted to the top 54 by suitable adhesives, and likewise the foam member 52 is secured to the hydrophobic membrane 57. Thereafter, the current collector 51 is secured to the foam member 52 by touch-melting of the foam (i.e., by lightly touching the current collector 51 with a hot tool) and suitable leads and terminals (not shown) are provided to form a top assembly 50.

The primary separator 45 is mounted by suitable adhesives to the anode frame 41. The trough then is loaded with paste to form the anode assembly 40. Preferably, a slight excess of paste is dispensed into the trough, and the excess is scraped off. The scraping tends to pack the paste into the trough, and thus, the correct amount of paste is more reliably dispensed.

The trough preferably is loaded with paste in an area remote from where sealing and joining of other battery components is performed. Once it is assembled, the anode assembly 40 does not have to be sealed in a leak-tight fashion to any other component of the cell 10. On the other hand, those parts of the cell 10 on which leak-tight seals must be formed are kept clean and dry, and such seals are more reliably formed.

The supplemental separator 35, oxygen impermeable member 36, and anode assembly 40 are loaded into the cathode assembly 30. The bottom 20 and top assembly 50 are positioned for final sealing, for example, by ultrasonic welding. It will be noted that bottom 20, anode frame 41, and top 54 are provided with, respectively, post 23, post 47, and post 56. When the cell is finally assembled, those posts 23, 47, and 56 abut and are joined together to provide further reinforcement for the cell. After final assembly, the cell also is preferably sealed with a thin, heat sealable, gas impermeable film to protect the cell from exposure to the atmosphere until it is placed in service, as is known.

The invention is further described by reference to the following example. It is not intended to limit the scope of the invention; rather, it is presented merely to facilitate the practice of the invention by those of ordinary skill in the art and to further disclose the inventor's best mode of doing so.

EXAMPLE 1

This Example demonstrates the use of the prismatic cells of the present invention to provide a 6-cell battery that would be suitable for use with electronic equipment, for example, a notebook computer battery.

The six cells used were approximately 3.4 inches wide by 3.95 inches long by 0.6 inches thick and were mounted vertically side-by-side (i.e., two 3-cell side-by-side stacks) in a test fixture, the overall dimensions providing a battery of approximately 8.5 inches high by 11 inches wide. This orientation was selected to mimic a battery that could be attached to the top outside of the display of a notebook computer in use.

Each cell was constructed as follows:

CATHODE FRAME

Machining

The cathode frame was machined from a solid clear acrylic plastic block 3.4 inches wide by 3.95 inches long by 0.34 inches thick. A 3.2 inch wide by 3.75 inch long by 0.24 inch deep first recess was machined into the block, leaving the frame with 0.10 inch thick walls at the sides and a 0.10 inch thickness across the face. A second recess 2.9 inches wide by 3.4 inches long by 0.05 inches deep was machined into the frame. Fifty-six (56) air entry holes, each $\frac{1}{16}$ inch in diameter, were drilled on evenly spaced centers across the exterior face. A $\frac{1}{16}$th inch wide by $\frac{1}{4}$ inch long slot was formed in one corner of the frame.

Subassembly

A 2.9 inches wide by 3.4 inches long by 0.05 inch thick piece of woven polypropylene mesh (McMaster-Carr Stock #9275744) was inserted into the second recess, flush against the interior of the frame. A 3.2 inches wide by 3.75 inches long by 0.020 inch thick piece of oxygen electrode (Electromedia AE-20) was then placed into the frame and bonded in place at the perimeter of the first recess, using epoxy. A $\frac{1}{4}$ inch wide 1.25 inches long nickel plated terminal strip, previously soldered to one corner of the wire mesh side of the oxygen electrode was fed through the slot in the corner of the frame.

ANODE INSERT

Machining

A 3.125 inches wide by 3.70 inches long frame was formed using $\frac{3}{16}$ inch square, $\frac{1}{16}$ inch thick, L-shaped ABS extruded stock, cut at 45° angles at the corners.

Subassembly

A 3.125 inches wide by 3.70 inches long sheet of 100% PVA paper (Johnson & Johnson 7601) was bonded to the wide face of the frame using polyamide adhesive. An anode mix, consisting of a previously mixed formula of 70 weight parts battery grade zinc powder, 30 weight parts KOH, 2 weight parts Nylon 31 floc and 0.6 weight parts gelling agent, was troweled into the frame. The amount of floc constituted approximately 60 vol % (uncompressed) of a mixture of the zinc, gelling agent, and floc, such that the volume of this dry mixture was substantially unchanged upon addition of electrolyte.

CELL TOP

Machining

The cell top was machined from a solid clear acrylic plastic block 3.4 inches wide by 3.95 inches long by 0.25 inch thick. Four (4) $\frac{1}{8}$ inch diameter gas vent holes were drilled on equally spaced centers through the face of the top. A fifth $\frac{1}{8}$ inch diameter terminal wire exit hole was drilled through the cell top in one corner.

Subassembly

Four (4) ½ inch squares of Celgard® type 2400 membrane were placed over the vent holes and bonded to the interior face of the cell top, using polyamide adhesive. A 3.125 inch by 3.5 inch pad of 0.070 inch thick white Volara® foam was bonded at its perimeter to the cell top using polyamide adhesive. A 3.125 inch by 3.5 inch piece of expanded copper mesh about 0.020 inches thick (product 4 CU 12-125, Delker Corporation, Branford, Conn.) was then placed on the foam and tacked in place with the tip of a hot soldering gun. A 4-inch long copper terminal wire was then soldered to a previously tinned solder pad at the center of the copper mesh, dressed flat against the copper mesh, and inserted through the exit hole in the corner of the cell top.

FINAL CELL ASSEMBLY

A 3.2 inch wide by 3.97 inch long sheet of PALL-RAI ZAMM-0 oxygen impermeable membrane was placed into the cathode frame against the oxygen electrode. The anode frame subassembly was then placed into the cathode frame against the ZAMM-0 membrane. The cell top subassembly was then placed against the rim of the cathode frame and bonded in place using epoxy cement.

Figure 5:
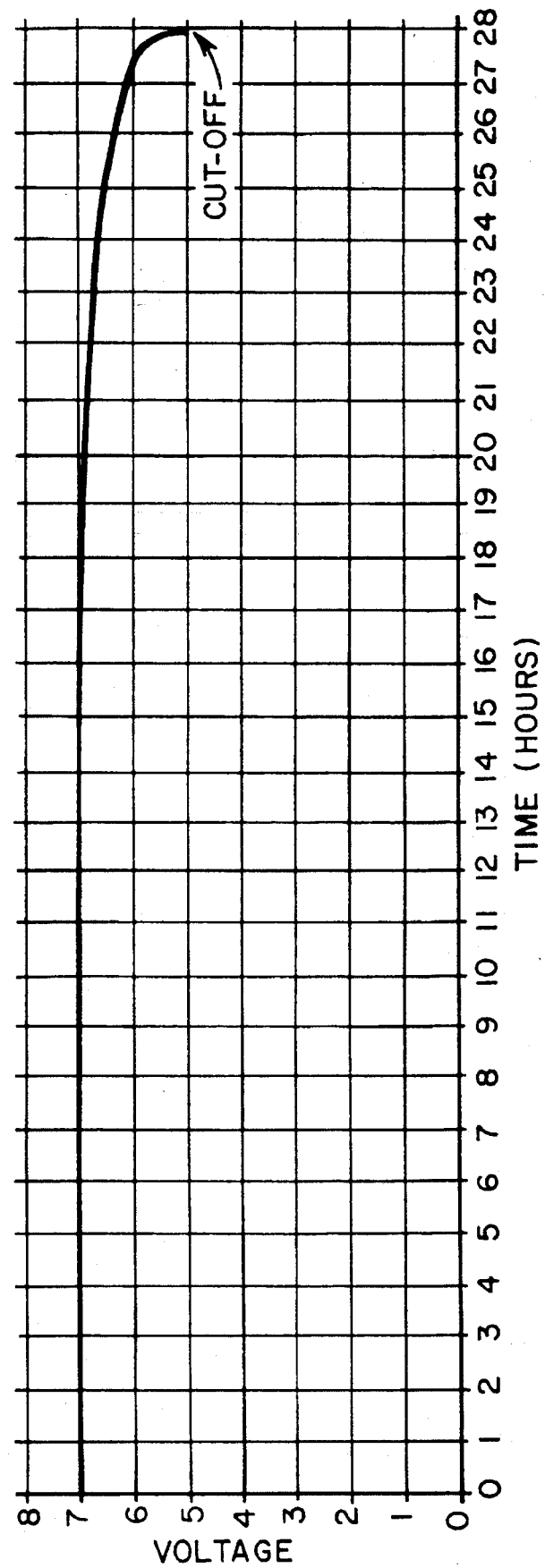
FIG. 5 is a graph of voltage versus time, showing the discharge performance of a battery suitable for a computer application, using the cells of the present invention.

FIG. 5 is a graph of the voltage versus time and hours for the battery. As indicated in FIG. 5, the battery delivered 28 hours of operation at a constant drain rate of 1.2 Amperes to a cutoff, after the 28 hours, of 5 V. Zince utilization for the cells was in the range of 80–90%.

This invention has been disclosed and discussed primarily in terms of specific embodiments thereof, but it is not intended to be limited thereto. Other modifications and embodiments will be apparent to workers in the art. For example, though described in the context of zinc-air cells, cells of the subject invention may be based on other metal-air electrochemistry and may incorporate other metal anodes such as aluminum or magnesium. Moreover, though the design is particularly advantageous in large, flat prismatic cells, the cell may be relatively small and have a cylindrical or button configuration.

I claim as my invention:

1. A prismatic zinc-air cell comprising:

a prismatic container having one or more oxygen access openings;

an air cathode disposed in the container in gaseous communication with the oxygen access openings; and an anode assembly which comprises a rectangular anode frame having peripheral members, a separator mounted proximate to one end of the anode frame and extending substantially continuously between the anode frame peripheral members, the anode frame and separator defining a trough, and a zinc anode comprising zinc, an aqueous electrolyte, and a gelling agent disposed in the trough in electrolytic communication with a first side of the separator, said anode assembly being disposed in the container such that a second side of the separator is in electrolytic communication with the air cathode.

2. The prismatic zinc-air cell of claim 1, wherein the anode frame includes one or more cross members extending between the anode frame peripheral members.

3. The prismatic zinc-air cell of claim 1, wherein:

the container comprises a top part, a bottom part, and a rectangular cathode frame having peripheral members and first and second ends, the top part, bottom part, and cathode frame cooperating to define the top wall, bottom wall, and side walls of the container;

the anode assembly is disposed in the container with the outer surfaces of the anode frame peripheral members abutting the inner surfaces of the cathode frame peripheral members proximate to the first end of the cathode frame; and the air cathode is mounted on the cathode frame and extends substantially continuously between the cathode frame peripheral members proximate to the second end of the cathode frame.

4. The prismatic zinc-air cell of claim 1, wherein the dimensions of the anode frame are selected such that the volume within the trough is substantially equal to the volume of a predetermined amount of zinc anode.

5. The prismatic zinc-air cell of claim 1, wherein the cell includes a current collector comprising an expanded mesh of double-pulled copper foil.

6. The prismatic zinc-air cell of claim 1, wherein the zinc anode comprises an inert, insoluble volume stabilizer present in an amount sufficient to enhance utilization of zinc in the anode.

7. The prismatic zinc-air cell of claim 6, wherein the cell includes an oxygen impermeable member disposed in the container between the air cathode and the zinc anode and allowing passage of electrolyte between the air cathode and zinc anode.

8. The prismatic zinc-air cell of claim 7, wherein the zinc anode is disposed in a layer and wherein the cell includes one or more anode support members embedded in and extending generally perpendicular to the zinc anode.

9. The prismatic zinc-air cell of claim 1, wherein the zinc-air cell includes:

an expansion space within the container adjacent to the zinc anode and accommodating expansion of the zinc anode during discharge of the cell;

a foam member generally occupying the expansion space and tending to oppose movement of the zinc anode away from the separator and to collapse upon expansion of the zinc anode during discharge; and one or more vent openings disposed in the container in gaseous communication with the expansion space to minimize pressure increase within the container as the foam member collapses during discharge of the cell.

10. A prismatic zinc-air cell comprising:

a prismatic container having a top wall, a bottom wall, and side walls;

one or more oxygen access openings disposed in the bottom wall of the container;

an air cathode disposed in the container in gaseous communication with the oxygen access openings;

an anode assembly which comprises a rectangular anode frame having peripheral members, a separator mounted proximate to one end of the anode frame and extending substantially continuously between the anode frame peripheral members, the anode frame and separator defining a trough, and a zinc anode comprising zinc, an aqueous electrolyte, and a gelling agent;

wherein the zinc anode is disposed in the trough in electrolytic communication with a first side of the separator and the initial volume of the zinc anode is substantially equal to the volume within the trough; and wherein the anode assembly is disposed in the container with the outer surfaces of the anode frame peripheral members abutting the inner surfaces of the container side walls and such that a second side of the separator is in electrolytic communication with the air cathode.

11. The prismatic zinc-air cell of claim 10, wherein the anode frame includes one or more cross members extending between the anode frame peripheral members.

12. The prismatic zinc-air cell of claim 10, wherein:

the container comprises a top part, a bottom part, and a rectangular cathode frame having peripheral members and first and second ends, the top part, bottom part, and cathode frame cooperating to define the top wall, bottom wall, and side walls of the container;

the anode assembly is disposed in the container with the outer surfaces of the anode frame peripheral members abutting the inner surfaces of the cathode frame peripheral members proximate to the first end of the cathode frame; and the air cathode is mounted on the cathode frame and extends substantially continuously between the cathode frame peripheral members proximate to the second end of the cathode frame.

13. The prismatic zinc-air cell of claim 10, wherein the cell includes a current collector comprising an expanded mesh of double-pulled copper foil.

14. The prismatic zinc-air cell of claim 10, wherein the zinc anode comprises an inert, insoluble volume stabilizer present in an amount sufficient to enhance utilization of zinc in the anode.

* * * * *

UNITED STATES PATENT AND TRADEMARK OFFICE
CERTIFICATE OF CORRECTION

PATENT NO. : 5,458,988
DATED : October 17, 1995
INVENTOR(S) : Ronald A. Putt

It is certified that error appears in the above-indentified patent and that said Letters Patent is hereby corrected as shown below:

ON THE TITLE PAGE:

[54] "METAL-AIR-CELLS HAVING IMPROVED ANODE ASSEMBLIES" should read -- METAL-AIR CELLS HAVING IMPROVED ANODE ASSEMBLIES --.

[56] References Cited

U.S. PATENT DOCUMENTS

Column 2, line 8, "4,116,626 09/1978 Saner et al." should read --4,115,626 09/1978 Sauer et al.--; and Column 2, line 37, "4,687,714 8/1987 Ottman et al." should read -- 4,687,714 8/1987 Oltman et al. --.

IN THE SPECIFICATION:

Column 6, line 16, "openings 2" should read -- openings 21 --;

Column 6, line 17, after "container" insert -- 11 --;

Column 6, line 24, "container 1," should read -- container 11, --;

UNITED STATES PATENT AND TRADEMARK OFFICE
CERTIFICATE OF CORRECTION

PATENT NO. : 5,458,988
DATED : October 17, 1995
INVENTOR(S) : Ronald A. Putt

It is certified that error appears in the above-indentified patent and that said Letters Patent is hereby corrected as shown below:

Column 7, lines 66 and 67, "frame 4" should read -- frame 41 --;

Column 8, line 6, "The anode frame 4" should read -- The anode frame 41 --;

Column 9, lines 10 and 47, "anode frame 4" should read -- anode frame 41 --;

Column 9, line 61, "current collector 5" should read -- current collector 51 --; and Column 10, line 51, "cathode frame 3," should read -- cathode frame 31, --.

Signed and Sealed this

Twenty-sixth Day of March, 1996

Attest:

BRUCE LEHMAN

*Attesting Officer*    *Commissioner of Patents and Trademarks*